Sept. 8, 1953 E. H. DRAKE 2,651,157
ONION DIGGING AND HARVESTING MACHINE
Filed June 14, 1951 5 Sheets-Sheet 1
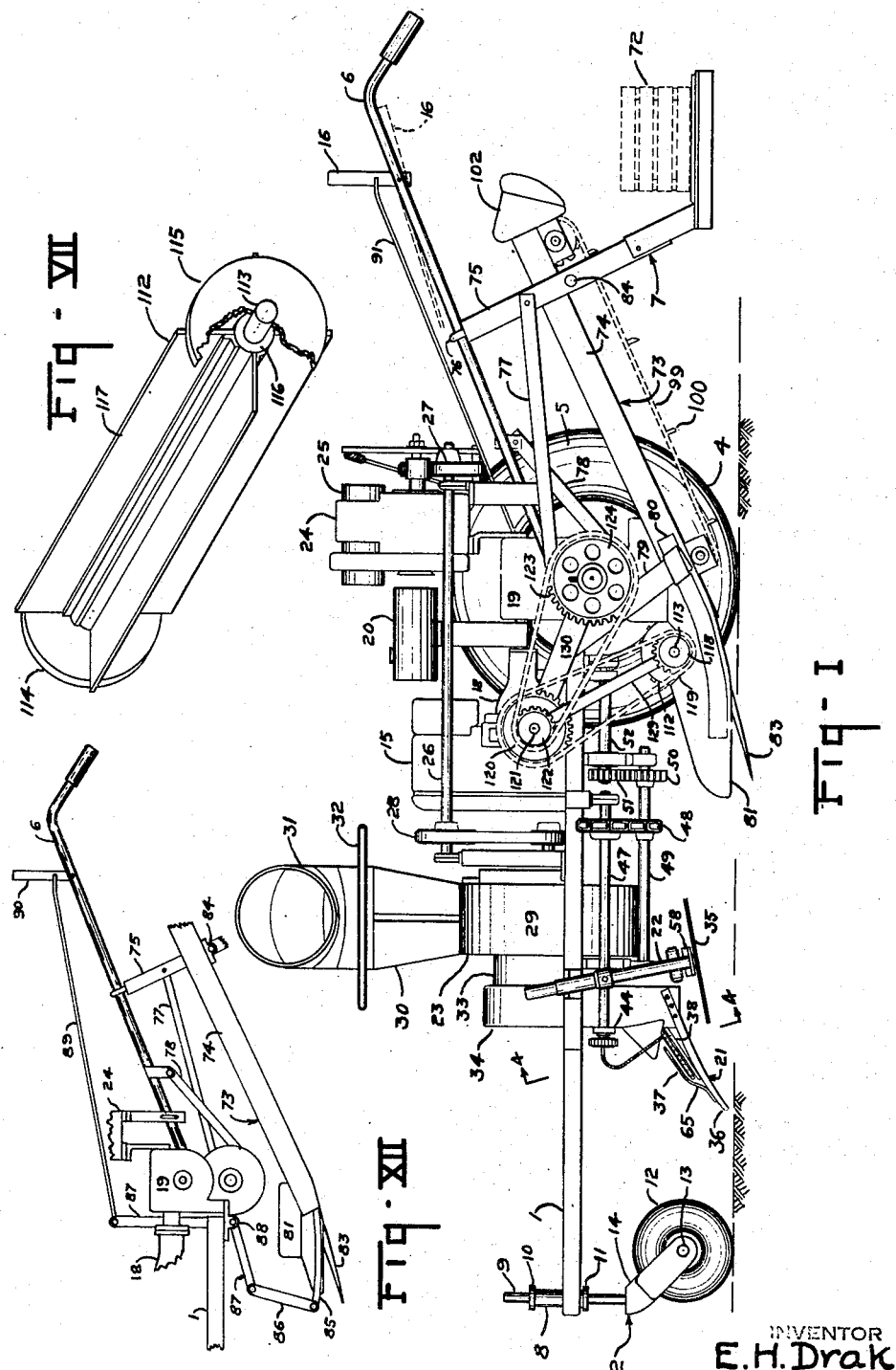
INVENTOR
E. H. Drake
BY Roy A. Plant
ATTORNEY Sept. 8, 1953
E. H. DRAKE
2,651,157
ONION DIGGING AND HARVESTING MACHINE
Filed June 14, 1951
5 Sheets-Sheet 2
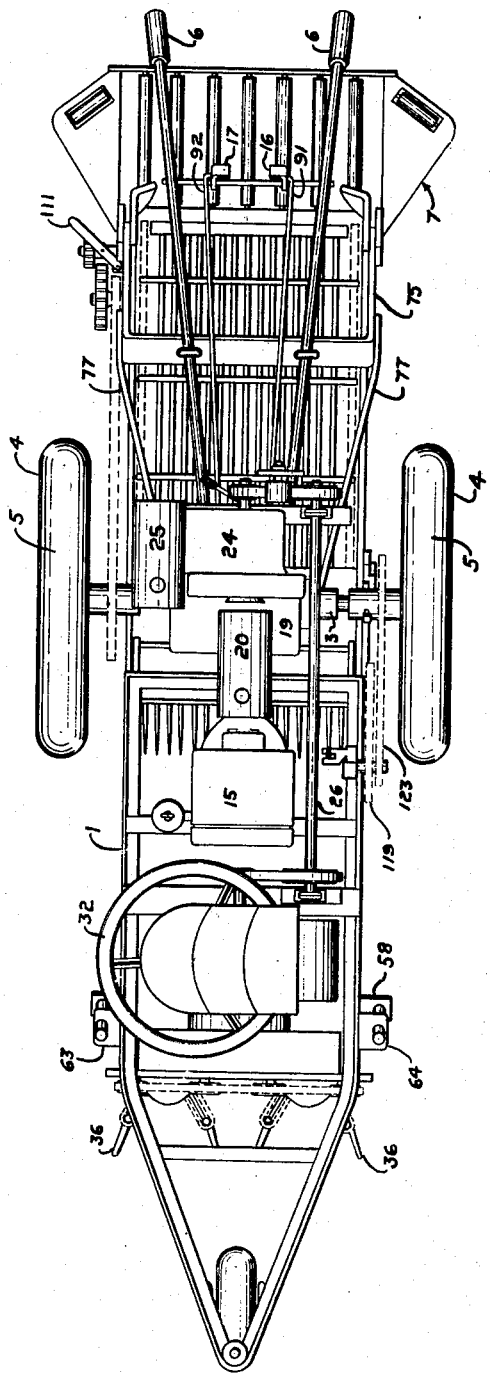
Fig-II
INVENTOR
E.H.Drake
BY Roy A. Plant
ATTORNEY

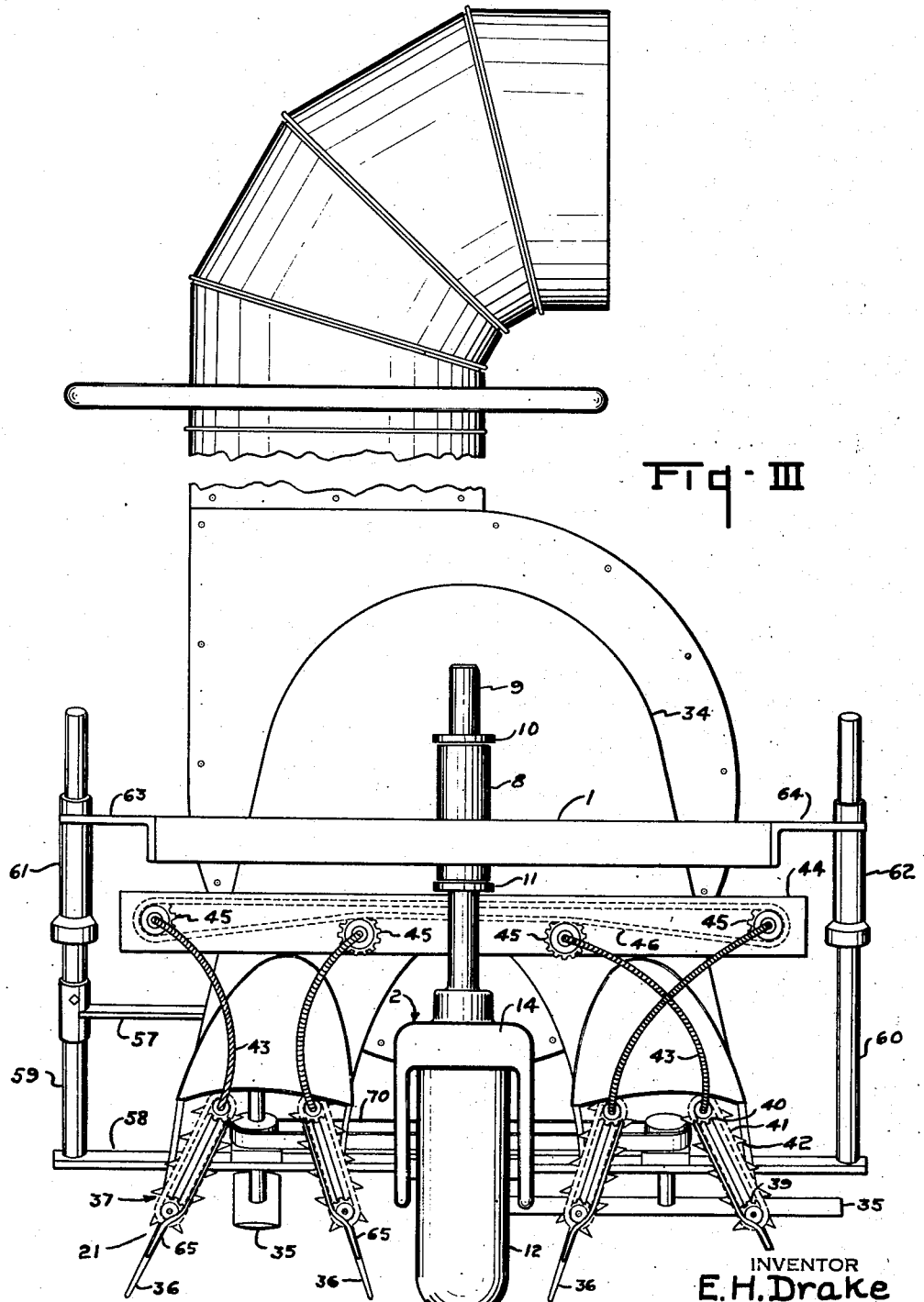

Sept. 8, 1953            E. H. DRAKE            2,651,157
ONION DIGGING AND HARVESTING MACHINE
Filed June 14, 1951            5 Sheets-Sheet 4
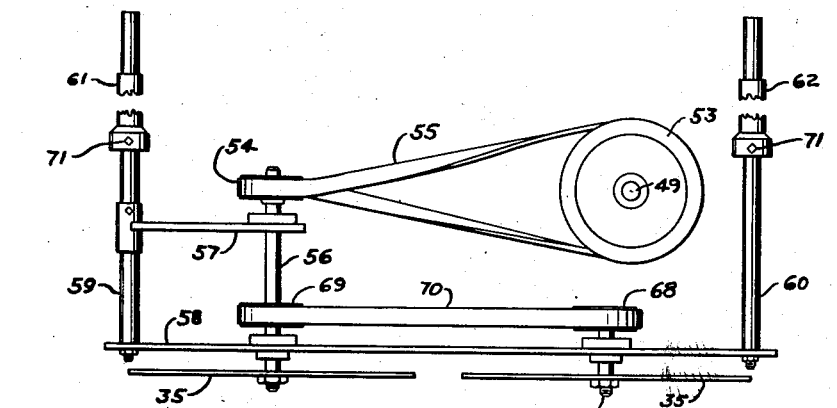
Fig-IV
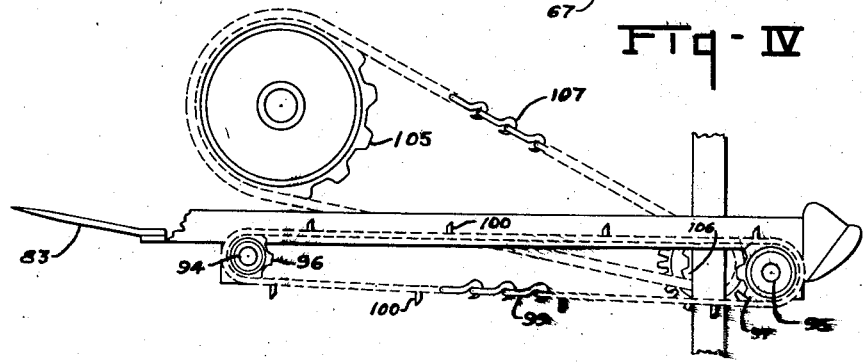
Fig-VI
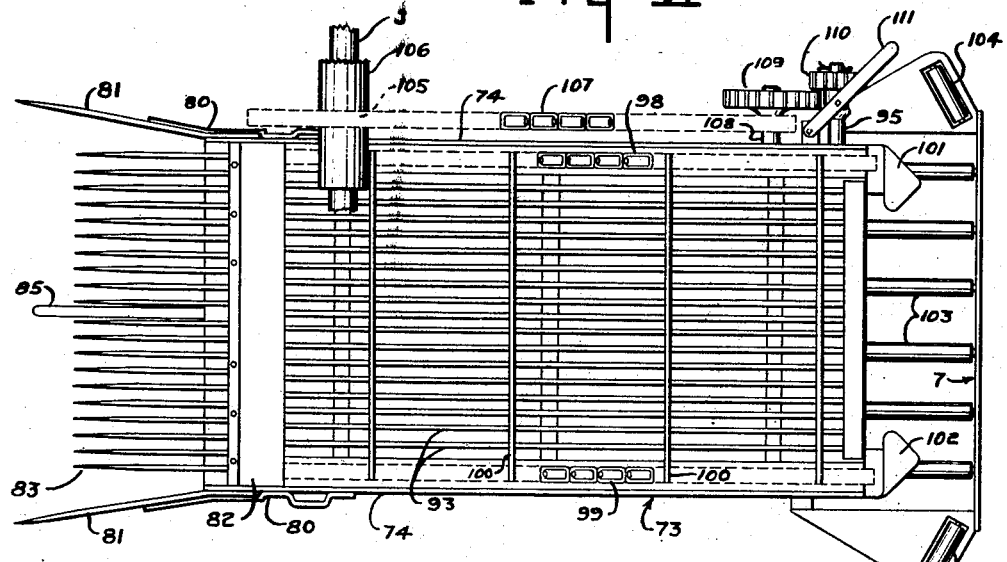
Fig-V
INVENTOR
E.H. Drake
BY Roy A. Plant
ATTORNEY Sept. 8, 1953 — E. H. DRAKE — 2,651,157
ONION DIGGING AND HARVESTING MACHINE
Filed June 14, 1951 — 5 Sheets—Sheet 5
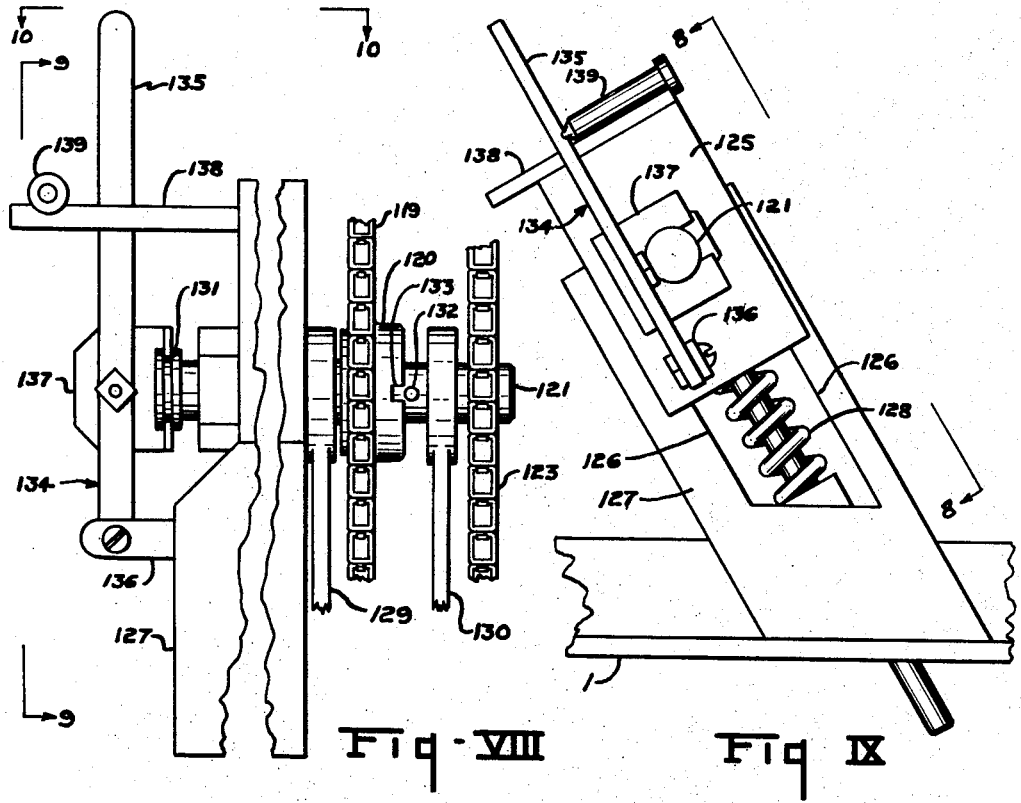
Fig-VIII  Fig-IX
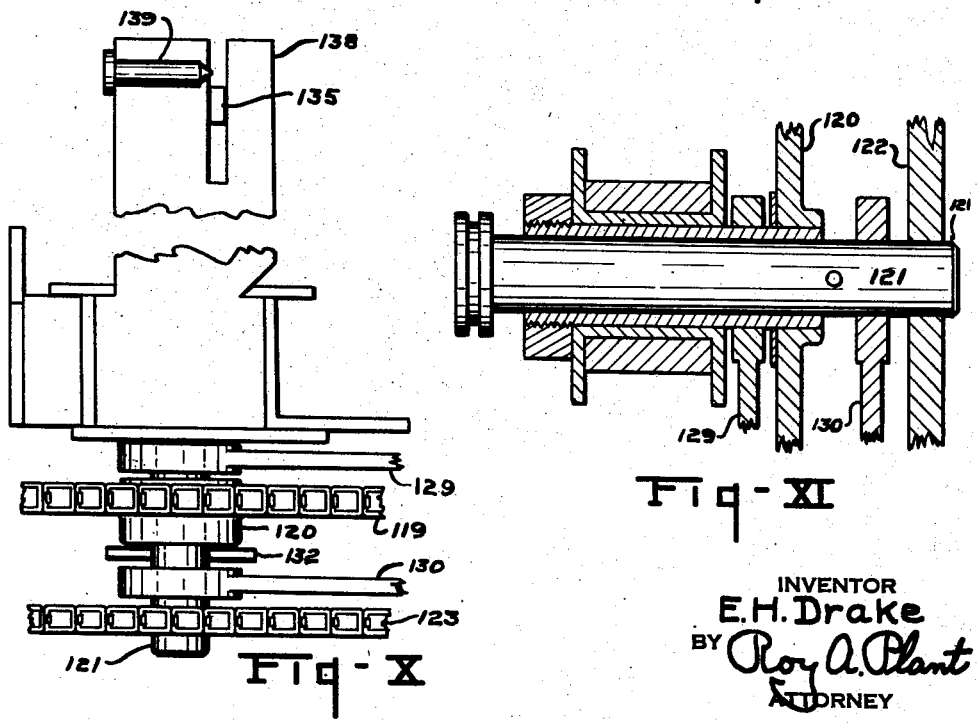
Fig-X  Fig-XI
INVENTOR
E. H. Drake
BY Roy A. Plant
ATTORNEY Patented Sept. 8, 1953

2,651,157

UNITED STATES PATENT OFFICE 2,651,157

ONION DIGGING AND HARVESTING MACHINE

Enoch H. Drake, Marshall, Mich.

Application June 14, 1951, Serial No. 231,467

4 Claims. (Cl. 55—137)

The present invention deals broadly with harvesting machines, and in its specific phases with machines for harvesting onions.

The harvesting of onions is an exceedingly difficult matter since onions at harvest time have a large portion of their tops lying on the ground and even partially covered with dirt while a few of the onions will have upstanding stiff seed spikes which will cause the onions to be tipped over if a harvester is passed over them. The onion bulbs moreover generally set exposed on the top of the ground and are only held in place by means of the roots below same. The onions when freshly harvested must also have an inch or two of the top left on same so that the strength of this portion can be drawn into the onion as it dries and cures after harvesting. These problems involving the topping, digging, and elevating of the onions and delivery of same into crates or the like have been so difficult of solution that, up to the present time, no fully successful harvesting machine has been produced. It was a recognition of these problems and difficulties as well as a knowledge of the complete lack of a satisfactory onion harvester on the market which lead to the conception and development of the present invention.

Accordingly among the objects of the present invention is the provision of a new and novel onion harvesting machine adapted to top, dig, elevate, and deliver onions to crates or the like.

Another object is to provide relatively rigid fingers for preliminarily lifting onion tops, and with those fingers supplemented by driven lifters for positively raising the onion tops prior to cutting same.

Another object is to provide suction lifting to supplement the driven mechanical lifters for the onion tops and to hold the latter in position for cutting.

Another object is to provide an onion harvester with whirling knives for severing the lifted onion tops so that they can be removed and discharged by means of a blower.

Another object is to provide the blower with a sidewise discharging outlet which is rotatably mounted for delivery of the severed tops on either side of the machine.

A further object is to provide the apparatus with two motors, one of which, among other things, propels the machine along the rows to be harvested, while the other drives the blower.

A further object is to provide the apparatus with a rotary sweep-type loader adapted to sweep the dug onions onto a conveyor for elevating and delivering them to crates or the like.

A further object is to provide a clutch for disengaging the rotary loader member at all times except when the harvesting of onions is to take place.

A further object is to provide an apparatus which is readily operable by an operator walking behind the apparatus and wherein the handling of crates can be readily taken care of by one man.

Still further objects and advantages of the present invention will appear as the description proceeds.

To the accomplishment of the foregoing and related ends, the invention, then, consists of the harvesting means hereinafter fully described and particularly pointed out in the claims, the annexed drawings, and the following description setting forth in detail certain means for carrying out the invention, such disclosed means illustrating, however, but one of various ways in which the principle of the invention may be used.

In the annexed drawings:

Figure 1 shows a side elevational assembly view, with a wheel and some other parts removed, illustrating a preferred form of the harvesting machine of the present invention.

Figure 2 shows a top view of the assembly illustrated in Figure 1.

Figure 3 shows an enlarged fragmentary front elevational view of the assembly illustrated in Figure 1.

Figure 4 shows a front elevational view of the cutting knives and drive for same as viewed along line 4—4 of Figure 1 looking in the direction of the arrows.

Figure 5 shows an enlarged fragmentary top view of the digging and conveying portion of the assembly illustrated in Figure 1.

Figure 6 shows a fragmentary side elevational view of the digger, the conveyer, and its drive, as illustrated in Figure 5, but without showing the inclination of same which appears in Figure 1.

Figure 7 shows an enlarged fragmentary perspective view of the rotary loader which pushes the material being harvested onto the conveyer.

Figure 8 shows an enlarged fragmentary front view of the clutch and drive mechanism for the rotary loader of Figure 7, as viewed along line 8—8 of Figure 9 looking in the direction of the arrows.

Figure 9 shows a fragmentary side view as taken at line 9—9 of Figure 8 looking in the direction of the arrows.

Figure 10 shows a fragmentary top view of the assembly illustrated in Figure 8, as taken along line 10—10 looking in the direction of the arrows.

Figure 11 shows a fragmentary center sectional view of the clutch shaft and members associated therewith, all in substantially the same position as shown in Figure 8.

Figure 12 shows diagrammatically, in a fragmentary longitudinal sectional view, the linkage used for lifting the front end of the elevator assembly, and which for clarity has been omitted from the other figures.

Referring more particularly to Figures 1, 2, and 3 of the drawings, it will be noted that the onion harvester has a frame 1 with the forward end of same supported on a caster-type adjustable wheel assembly 2 while the rear end of the frame has conventionally mounted thereon an axle shaft assembly 3 on the outer ends of which are keyed wheels 4 which preferably have large cross section tires 5 to support the apparatus with a minimum of sinking into the ground under harvesting conditions. In order to operate and steer the apparatus, a pair of rearwardly extending handles 6 are provided. The onion top lifting and cutting portions of the assembly are at the forward end of the apparatus while the digging and elevating portion is immediately therebehind. At the rear of the onion elevator there is preferably provided a crate supporting assembly 7 as is more particularly shown in Figure 1.

The mounting of the adjustable wheel assembly 2 at the forward end of frame 1 involves the use of a sleeve 8 rigidly anchored to frame 1 and carrying the usual bearings therein (not shown) for upright shaft 9. This shaft is provided with upper and lower collars 10 and 11 conventionally anchorable to shaft 9 for adjusting the height of the frame 1 above wheel 12 which is rotatably mounted in conventional manner on shaft 13 which passes through the lower end of fork member 14 of the caster wheel assembly 2. This permits raising and lowering of the forward end of the harvesting machine frame as required.

The propelling of the apparatus to and from the harvest field, as well as during harvesting, is taken care of by an engine 15, preferably of the gasoline driven type, with conventional controls including a clutch (not shown) for individually driving each wheel with said clutches being operated through control levers 16 and 17, Figure 2. The engaged position of the control levers for these clutches is shown in solid lines in Figure 1, in connection with control lever 16, while the disengaged position is shown in dotted lines. Engine 15 is mounted on frame 1, as is shown in Figure 2, and is connected by means of a drive shaft extending in conventional manner through drive shaft housing 18, Figure 1, to differential 19 through which engine 15 is connected to the stub axle shafts on which wheels 4 are mounted. The tank 20 is used for carrying the gasoline which operates engine 15.

In order to power drive the propelling of the whole apparatus, operate the lifting assembly 21 (Figure 1) which primarily lifts the onion tops, and to drive the cutting assembly 22, as well as the blower assembly 23 for disposing of the cut onion tops, it is ordinarily best to have, in addition to engine 15, a second engine 24 which operates on gasoline or the like supplied from tank 25, although it is obvious that the whole harvesting machine could be power driven by one engine and it is intended that the showing in the drawings be considered as diagrammatically illustrating same. Engine 24 is conventionally connected to drive shaft 26 by means of a belt drive 27, or the like. Shaft 26 in turn is operably connected by means of a second belt drive 28 to blower 29, of blower assembly 23. Engine 24 thus solely drives blower 29 and takes enough load off of engine 15 so that it can be relatively small and yet satisfactorily operate the other driven parts of the assembly.

The discharge end of blower 29, Figure 1, is provided with a delivery pipe 30 on which is rotatably mounted an elbow member 31 with a hand wheel 32 connected thereto for rotating elbow 31 to direct the air stream carrying the severed tops in desired direction which normally is to the side of the assembly where the onions have been harvested. The inlet of blower 29 is in the form of a tubular member 33 at the forward end of the assembly and that tubular member has mounted on its forward end an inverted generally V-shaped suction box 34, Figure 3, with the bottom and lower front faces of the two legs of this inverted V-shaped member being open and of a spacing substantially the same as the distance between two rows of onions to be harvested. In order to make it possible to better understand the operation of the onion top cutters 35 the back portion of these inverted V-shaped members have been omitted in Figure 3.

In the course of the growth of onions and especially when they are near their full growth, a considerable portion of the tops of the onions in a row get broken over so that they lay on the ground and become matted and even partially covered with dirt under the effects of driving rain. In order to harvest the onions, it becomes necessary to lift these tops which lay down so that they can be properly severed from the onion bulbs. To take care of the preliminary raising of the tops a lifting assembly 21, Figures 1 and 3, is provided at the front of the onion harvesting machine. Each row being harvested by the machine has one of these lifting assemblies and each of such assemblies has a pair of downwardly extending and sidewise projecting members with a rod like member 36 adapted to extend along side of the row of onions being harvested and contact or slightly dig into the ground so as to pass under the onion tops and mechanically lift them as the apparatus is being propelled forward and along the row of onions. While this preliminary lifting of the onion tops is a starting measure, it is not enough when the tops have been heavily matted or pressed down with dirt. In order to take care of this situation, each row of onions to be harvested through the aid of harvesting assembly 21 utilizes a power driven apparatus 37 as is more particularly shown in Figure 3. Since each power driven apparatus 37 is identical with the others, only one will be described. Each power driven apparatus 37 is supported on rod-like member 36 and consists of a plate 38, Figure 1, anchored as by welding to rod 36. That plate in turn is provided with forward and rear pinions 39 and 40, Figure 3, around which pass a chain 41 having outwardly projecting teeth 42 thereon at spaced intervals. A conventional flexible drive 43 is connected to pinion 40 for rotating same and moving said chain 41 so that the side of same facing the row being harvested will move backward and upward to forcibly carry the onion tops into a substantially upright cutting position in front of the suction inlet to suction box 34. A guide rod 65 is preferably supported on rod-like member 36 and follows along and over chain 41 to help guide the onion tops to the cutting position.

Since each power driven apparatus 37 of a pair of same operate in opposite directions to each other in order to simultaneously lift and bring together the onion tops of a row of onions, a suitable drive for same must be provided. There is diagrammatically shown in Figures 1 and 3 a plate 44 on which four pinions 45 are conventionally mounted for rotation and actuation of the flexible drives 43 with a drive chain 46 connecting them in the manner shown. One of these pinions 45 is connected to a power drive shaft 47, Figure 1, which is connected by a chain drive 48 to a second shaft 49 which is connected by spur gears 50 and 51 to shaft 52 which is driven by engine 15 in conventional manner, such as through differential 19.

With the onion tops mechanically lifted and held taut by the suction of blower 29 as exerted on the onion tops at the inlet of suction box 34, those onion tops are in a position to be severed from the onion bulb. To accomplish this, shaft 49, Figure 1, has mounted on its forward end a pulley 53, Figure 4. That pulley in turn drives a second pulley 54 by means of a belt 55. Pulley 54 is mounted on shaft 56 and that shaft in turn is carried near its upper end on an arm 57 and near its lower end on a cross bar 58 which is joined at its ends to endwise adjustable upright posts 59 and 60 which pass through sleeves 61 and 62 rigidly connected to brackets 63 and 64 mounted on frame 1, as is more particularly shown in Figures 2 and 3. Mounted on the lower end of shaft 56, Figure 4, is a rotary knife 35 while a second like rotary knife 35 is similarly mounted on a stub shaft 67 carrying on its upper end a pulley 68 which is connected to pulley 69 on shaft 56 by means of a belt 70. With the knives mounted in this manner, it will be noted that they both rotate in the same direction and in unison with the operation of power driven shaft 49. In order to raise or lower cutting blades 35, upright posts 59 and 60 may be moved up or down through sleeves 61 and 62 and anchored in fixed position therein by means of set screws 71, Figure 4, so that the onion tops will be severed under operating conditions at the desired distance above the onion bulb.

After the onions have been topped, the next step involves lifting them from the ground and elevating them for delivery into a crate 72 or the like, Figure 1. To take care of this, the apparatus is provided with an elevating assembly 73 which has side members 74, each mounted at its rear end on side supports 75 of crate supporting assembly 7. The side supports 75 are of general inverted U-shape, as shown in Figure 2, and same is anchored to handles 6 by means of a pair of U-members 76. Side supports 75 are provided with a pair of braces 77 the forward end of which is anchored to the differential 19 in conventional manner. Handles 6 are also braced by means of a pair of braces 78, the forward ends of which are also conventionally anchored to differential 19, adjacent the bottom thereof. Handles 6 are are also fastened in conventional manner to differential 19 which in turn is conventionally anchored to frame 1.

The forward end of elevating assembly 73 is held against side sway by means of a pair of arms 79, Figure 1, the upper ends of which are rigidly anchored at opposite sides of frame 1 while the lower ends of said arms 79 are loosely and slidably held against the side of side members 74 by means of a member 80 rigidly fastened to the outer face of each side member 74 in manner permitting the forward end of the elevating assembly 73 to be moved up and down to a limited extent. This member 80 has a sidewise offset portion for arm 79 as is shown more particularly in Figure 5, while the forward end of member 80 flares outward and upward to support the outer face of a shield member 81, Figure 1.

The forward end of the elevating assembly has a flat cross plate 82, Figure 5, for a purpose to be hereinafter described. Projecting forward from elevating assembly 73, and joined thereto under plate 82, is a multiplicity of forward extending digging fingers 83 which are closely spaced so that onions will slide along their upper face, while the whole apparatus is being moved forward, and yet will allow small stones and dirt to pass through same. In order to permit elevator assembly 73 to have its forward end adjusted up and down to meet varying digging conditions, the rear end of the elevator assembly is pivotally mounted on side supports 75 in conventional manner on pivots 84.

Rigidly connected to the forward end of elevator 73 is an arm 85, Figure 12, which is connected by means of a link 86 to a bellcrank 87 pivotally mounted on a conventional pivot 88. The upper end of bellcrank 87 is pivotally joined to one end of rod 89. That rod in turn is pivotally connected to operating lever 90 which in turn is pivotally joined to handles 6 in similar manner to control levers 16 and 17. Rods 91 and 92, Figure 2, which connect to control levers 16 and 17, as well as rod 89, Figure 12, connected to operating lever 90, are each preferably provided with a moderate offset bend at its operating end, as shown, so that when the operating levers are in lowered position the rods will be firmly held in operating position.

The elevating assembly 73, as is shown in Figure 5, is provided with a multiplicity of lengthwise extending closely spaced rods 93 so that any loose dirt adhering to onions moved thereover will drop therethrough. This elevating assembly 73 has, as a part thereof, a conveyer which includes a forward shaft 94, Figure 6, and a rear shaft 95, on the opposite ends of each of which are respectively mounted chain sprockets 96 and 97. Conventional bearings (not shown) are used for supporting the ends of these shafts 94 and 95, and mounted on the sprockets 96 and 97 of same are chains 98 and 99, Figure 5. Mounted crosswise of elevator assembly 73 and joined at their ends to said chains 98 and 99, are a multiplicity of spaced apart elevator cross bars 100, Figures 5 and 6. Those cross bars rest on top of rods 93 and slide upward on the upper face of same during operation of the elevator.

Mounted on the rear end of elevator assembly 73 at opposite sides thereof are shield members 101 and 102 which act as baffles for delivering onions from the conveyer in a narrower stream adapted to be received by crate 72, Figure 1, on crate supporting assembly 7. That crate supporting assembly preferably is provided with a series of rollers 103, Figure 5, extending lengthwise of the crate supporting assembly 7 so that loaded crate 72 can be easily pushed sidewise and upon reaching angularly mounted roller 104, the crate will turn and be dropped off under rearward motion opposite to the direction of movement of the onion harvester under operating conditions.

In order to drive chains 98 and 99 and their connected elevator cross bars, a sprocket 105, Figure 6, is mounted on hub 106 of the right hand wheel 4. Connecting that sprocket to sprocket 106 is a chain 107. Sprocket 106 is mounted on a stub shaft 108, Figure 5, which carries a spur gear 109 on its outer end. That spur gear is adapted to mesh with sliding gear 110 which is keyed on shaft 95 and adapted to be moved endwise in and out of mesh with spur gear 109 by means of a conventional operating lever 111. It is thus to be seen that when the onion harvester is to be moved under its own power from field to field or the like, during which time the elevating of onions is not required, operating lever 90, Figure 12, may be operated to lift the forward end of elevating assembly 73 and sliding gear 110 may be disengaged from spur gear 109 which will thus place the apparatus in condition for transportation so far as the elevating mechanism is concerned.

In the digging of the onions as the machine moves forward along the rows, it has been found that some means should be provided for pushing the onions off of the digging fingers 83, Figure 5, and onto rods 93 where the elevator cross bars 100 can slide them upward for delivery into crate 72 or the like. A convenient way of taking care of this transfer of the onions off of the digging fingers 83 is to provide a flat cross plate 82 with that cross plate sufficiently elevated at its rear edge to permit the elevator cross bars 100 to pass thereunder and pick up the onions as they are pushed off of plate 82 onto rods 93.

A convenient form of apparatus for pushing the onions across plate 82 is illustrated in Figure 7. This pusher apparatus 112 is provided with a shaft 113 with end plates 114 and 115. Mounted on shaft 113 between said end plates 114 and 115 is a body member 116 to which is conventionally joined a series of sweeping blades 117. These blades are preferably made out of heavy rubber belting anchored edgewise and tests have indicated that four such sweeping blades 117 will meet most requirements. The ends of shaft 113 are conventionally mounted on bearings (not shown) mounted in fixed position to side members 74 of the elevating assembly 73.

The pusher apparatus 112 has mounted on one end of its shaft 113 a sprocket 118, Figure 1, connected by chain 119 to sprocket 120, mounted on shaft 121, Figure 8. On the outer end of shaft 121 is mounted a sprocket 122, Figure 11, which is connected by means of chain 123, Figures 1 and 2, to sprocket 124 connected to the hub of the left hand wheel 4.

Shaft 121, Figure 8, is mounted on a sliding block 125, Figure 9, carried in ways 126 of angular supporting member 127 which is rigidly anchored to frame 1. Sliding block 125 is resiliently held in elevated position by means of a compression spring 128 which holds chains 119 and 123 relatively tight at all times. Supporting member 127 is of angular construction as shown in Figure 9 so that when mounted with the correlated parts in the position shown in Figure 1, it will permit the forward end of elevating assembly 73 to be pivotally moved about pivots 84 to a limited extent without disturbing the relative tightness of chains 119 and 123. Arm 79, Figure 1, is mounted to permit this limited angular movement of elevator assembly 73 while brace arm 129 acts to space and pivotally connect shaft 121 to shaft 113 at the forward end of elevating assembly 73. Brace arm 130 in turn spaces and pivotally connects shaft 121 to a sliding sleeve (not shown) on the hub of left hand wheel 4.

Since it is only necessary to operate the onion pusher apparatus 112 when onions are being harvested, clutch means are provided for disengaging pusher apparatus 112 except when required for the pushing of onions or the like onto the elevating assembly 73. To accomplish this, shaft 121 is provided with a circumferentially slotted end 131, Figure 8, and with a cross pin 132 adapted to mesh with slot 133 in the hub portion of sprocket 120. By moving shaft 121 endwise until cross pin 132 meshes with slot 133, this will directly connect sprocket 122 with sprocket 120 so that they will rotate in unison with the result that any rotation of sprocket 124, Figure 1, will cause pusher apparatus 112 to be rotated in proper direction for sweeping onions or the like off of digging fingers 83 and depositing them on elevating assembly 73 in position for delivery to crate 72.

In order to move shaft 121 endwise, there is provided an operating assembly 134, Figures 8 and 9, consisting of an operating lever 135 pivotally mounted at its lower end on a bracket 136 extending from the side of sliding block 125. Pivotally connected to operating lever 135 is a forked end bracket 137 which engages the circumferential slot 131 in the end of shaft 121 so that movement of operating lever 135 will move that shaft endwise. In order to hold operating lever 135 in position with cross pin 132 engaging slot 133, there is provided a slotted holding member 138 which carries a spring actuated gripper 139 so that when lever 135 is moved to its outermost or operating position the spring actuated gripper will resiliently hold same in that position.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. In an onion harvesting machine, a mobile frame, a conveyor on said frame including a plurality of forwardly declined parallel bars with their forward ends adjacent the ground line, an endless conveyor including spaced flights trained around said bars with the flights extending transversely thereof, an onion digging element on said conveyor at the forward lower ends of the bars and a rotary onion pusher element having onion sweeping blades extending transversely above said onion digging element for sweeping the dug onions from the digging element onto the forward lower ends of the bars of said conveyor.

2. An onion harvester as in claim 1, wherein the onion digging element comprises a plurality of forwardly extending parallel digging fingers.

3. An onion harvester as in claim 1, wherein the conveyor comprises side members paralleling the forwardly declined parallel bars and a shield at the forward end of each side member to prevent the lateral escape of dug onions.

4. An onion harvester as in claim 1, wherein the conveyor comprises side members paralleling the forwardly declined parallel bars, a shield at the forward end of each side member to prevent the lateral escape of dug onions, and an inwardly directed shield at the rear upper end of each side member for concentrating the onions to a point of discharge from the conveyor.

ENOCH H. DRAKE.

References Cited in the file of this patent

UNITED STATES PATENTS

| Number | Name | Date |
|---|---|---|
| 2,279,183 | Stimatze | Apr. 7, 1942 |
| 2,433,799 | Walz et al. | Dec. 30, 1947 |
| 2,435,334 | Wurtele | Feb. 3, 1948 |
| 2,513,111 | Schiller | June 27, 1950 |
| 2,530,041 | Bennett | Nov. 14, 1950 |
| 2,538,402 | Walz et al. | Jan. 16, 1951 |
| 2,579,013 | Sampson | Dec. 18, 1951 |